April 17, 1945.                S. J. STRID                2,373,983
                          COTTER PIN ASSEMBLY
                          Filed March 30, 1944
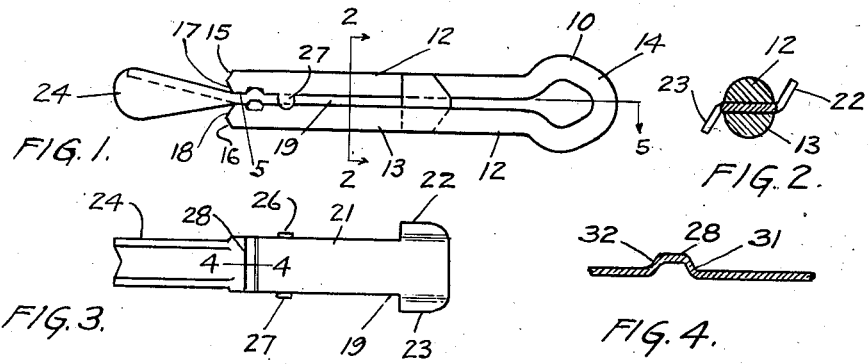
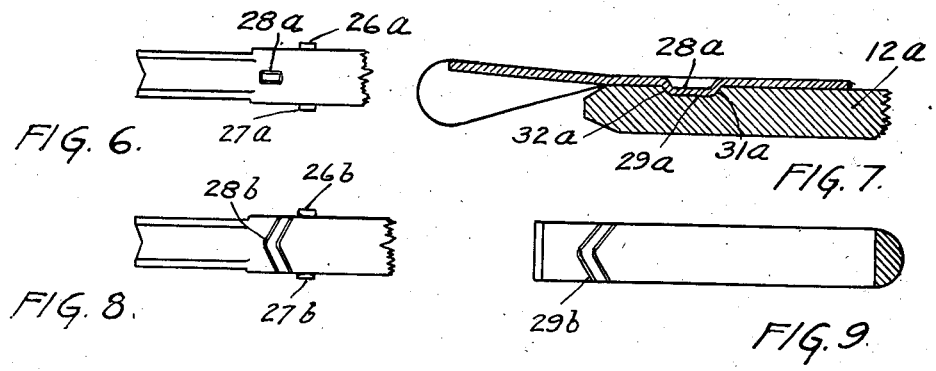
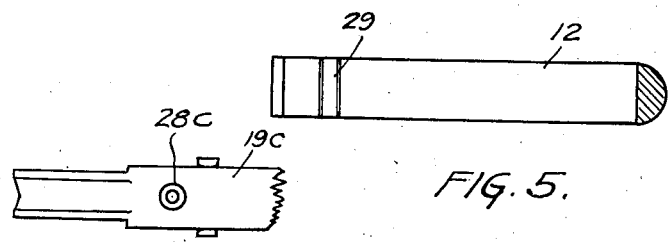
INVENTOR.
SVEN J. STRID
BY Mann, Brown & Co.
ATTYS.

Patented Apr. 17, 1945

2,373,983

UNITED STATES PATENT OFFICE 2,373,983

COTTER PIN ASSEMBLY

Sven J. Strid, Chicago, Ill., assignor to T & S Corporation, Chicago, Ill., a corporation of Illinois Application March 30, 1944, Serial No. 528,693

8 Claims. (Cl. 85—8.5)

This invention relates to fastening devices, and more particularly to cotter pins and means for spreading the same and for holding the spreading means in position on the pin during handling and shipment.

One of the principal objects of the invention is the provision of a new and improved cotter pin assembly including novel means for retaining the mechanism in assembled relation during handling and transportation prior to the installation of the device.

Another object of the invention is the provision of a new and improved cotter pin assembly having novel means for holding the parts in fixed relation after the elements have been assembled.

A further object of the invention is the provision of a new and improved cotter pin assembly that is inexpensive to manufacture, efficient in use, and that may be readily assembled.

Other and further objects and advantages of the invention will appear from the following description, taken in connection with the accompanying drawing in which Fig. 1 is a side elevation of the cotter pin assembly;

Fig. 2 is a section on the line 2—2 of Fig. 1;

Fig. 3 is a plan view of the spreader member;

Fig. 4 is a section on the line 4—4 of Fig. 3;

Fig. 5 is a section on the line 5—5 of Fig. 1;

Fig. 6 is a plan view of an outer end portion of a modified form of spreader member;

Fig. 7 is a longitudinal vertical section through the outer portion of one of the spreader arms, with the form of spreader shown in Fig. 6 in position thereon;

Fig. 8 is a plan view of the outer end of a further modified form of spreader member;

Fig. 9 is a plan view of one of the spreader arms, with which the modified form of construction shown in Fig. 8 is adapted to be employed; and Fig. 10 is a plan view of a further modified form of spreader member, with parts broken away.

In my Patent No. 2,153,440, of April 4, 1939, is shown a conventional cotter pin having a spreader member. Means are provided for preventing the spreader member from moving laterally relative to the arms of the cotter pin, but no means are provided for holding the spreader member from sliding outwardly longitudinally of the pin except the clamping action of the arms against the spreader member. In the handling and transportation of cotter pins, some of these spreader members become detached probably because in some of these pins the arms are slightly spread apart and do not firmly clamp the spreader in position.

Referring now to the construction shown on the drawing, the reference character 10 designates a cotter pin assembly which comprises a cotter pin having the arms 12 and 13 connected by a loop 14, as is usual in such constructions. The pin is preferably made of half round material, with the flat surfaces of the arms opposite each other. The outer ends of the arms may be beveled off, as at their outer sides, at 15, 16, for facilitating the entrance of the pin in an aperture. The inner edges of the ends are also beveled, as at 17, 18, for facilitating the insertion of the spreader member 19 between the arms.

The spreader member 19 comprises a flat intermediate or body portion 21, having laterally extending portions 22, 23, which form shoulders for limiting the movement of the spreader member through an opening in a bolt or the like, as will presently appear. The extension 22 may be bent slightly in one direction, and the extension 23 in the opposite direction, as shown in Fig. 2, for preventing lateral movement of the inner end of the spreader member relative to the arms of the pin, as shown in Fig. 2.

The outer end of the spreader member is enlarged, and the edges are inclined and adapted to be bent to a position at right angles to the flat portion 21 to form a wedge member 24. The wedge member 24 may be bent laterally slightly relative to the flat portion 21, so that the axis of the wedge will be coincident with the longitudinal axis of the flat portion 19, as shown in Fig. 1 of the drawing.

Suitable means are provided for preventing the lateral movement of the outer end of the spreader member relative to the arms 12 and 13. As shown, the side edges of the outer end of the flat portion 21 are provided with limiting or positioning members or tabs 26, 27, which are bent transversely to the plane of the flat portion 21 so that they will engage the side edges of the arms, thus limiting the lateral movement of the outer end of the spreader member.

It is also desirable that means be provided for resiliently resisting the relative longitudinal movement of the spreader member. Any suitable means may be provided for this purpose. As shown in Figs. 3 and 4, the flat portion 21 of the spreader is provided with a retainer member in the form of a raised portion, rib or offset 28, which may be, and preferably is, made by a depression or offset, as shown in Fig. 4. This offset 28 extends entirely across the flat portion 21 and is adapted to engage or snap into a corresponding recess 29 in the flat surface of either arm, as shown in Fig. 1. This rib extends transversely to the pin and entirely across the arm. Both of the arms are preferably, though not necessarily, provided with a transverse recess 29 (Figs. 1 and 5) adjacent their outer ends, so that it is not necessary, in assembling the pin, to turn the spreader in a particular manner before it is inserted.

In inserting the spreader it is pushed inwardly from the outer end of the arms until the rib or offset 28 engages or snaps into one of the recesses 29. The engagement of the rib or offset 28 in the recess 29 will yieldably prevent the spreader member from moving longitudinally of the pin. The interengaging of the recess and the rib or offset 28 will normally resist lateral movement of the outer end of the spreader member relative to the pin, as well as resist the longitudinal movement thereof.

In Figs. 6 and 7 is shown a modified form of interengaging means for the spreader and arms of the pin, and in this form of construction the retainer member or projection 28ª extends longitudinally of the pin or is more or less conical, and is adapted to snap into or engage a corresponding recess 29ª of an arm 12ª of the pin.

In both forms of the construction shown in Figs. 3, 4 and 6, the projections 28 and 28ª have inclined sides 31, 32, and 31ª, 32ª, respectively, which are adapted to engage corresponding inclined sides in the corresponding recess; so that while the interengagement is sufficient to hold the parts in assembled relation, it will require but small force applied to cause the projection to ride up out of the recess.

The form of construction shown in Figs. 8 and 9 differs from that described only in the different shape or form of the interengaging retaining means. In this form of construction the retaining rib or offset portion 28ᵇ is V-shaped, and a corresponding V-shaped recess 29ᵇ is made in the outer end of each of the arms of the pin, as shown in Fig. 9. With this type of interengaging ribs and recesses the spreader member will be held from lateral as well as longitudinal movement during shipment, but the guides or tabs are convenient in assembling the parts since they will function as guides while the spreader member is being inserted between the arms of the pin.

The form of construction shown in Fig. 10 differs from that shown in Fig. 6 in that the retainer member 28ᶜ of the spreader member 19ᶜ is in the form of the frustum of a cone, and is adapted to snap into a corresponding recess, or into a recess like that shown at 29, 29ª, or 29ᵇ.

It is thought from the foregoing, taken in connection with the accompanying drawing, that the operation and construction of my device will be apparent to those skilled in the art, and that changes in size, shape, proportion and details may be made without departing from the spirit and scope of the appended claims.

I claim as my invention:

1. In a cotter pin assembly, a cotter pin having a pair of arms connected by a loop portion, the free ends of said arms being adjacent each other, a spreader member having a flat body portion between said arms and having a wedge portion for spreading said arms apart, shoulder members on the inner end of said spreader for causing relative movement of said pin and spreader member when the latter is applied, interengaging means between the sides of said arms and pin, and positioning members on the side edges of said spreader member for engaging the sides of said arms for preventing lateral displacement of said spreader member relative to said arms.

2. In a cotter pin assembly, a pin comprising a pair of arms connected together by a loop portion, the free ends of said arms being slightly spread apart and beveled at their inner and outer sides, a spreader member between said arms having shoulders extending laterally outwardly at one end and a wedge portion at the other end with the thin portion of the wedge on the side toward the shoulders, positioning members on the side edges of said spreader remote from said shoulders for preventing lateral movement of the other end of said spreader member relative to said arms, the inner sides of said arms adjacent the outer ends thereof being provided with recesses, and said spreader member having a projection on one face for cooperating with said recesses for yieldingly resisting the removal of said spreader by a longitudinal movement thereof, said projection member and recesses extending transversely to said arms and spreader member.

3. In a cotter pin assembly, a pin comprising a pair of arms connected together by a loop, a spreader member between said arms and having shoulders at one end and a wedge portion at the other, and an interengaging V-shaped projection on said spreader adjacent said wedge portion for engaging a corresponding V-shaped depression in said pin for yieldably holding said spreader member against both longitudinal and lateral movements on said pin.

4. In a cotter pin assembly, a pin comprising a pair of arms connected together by a loop portion, at least one of said arms having a recess on its inner face intersecting the longitudinal center line of said face, and a spreader between said arms having two shoulders extending laterally outward near one end in engagement with opposite sides of said pin to limit lateral movement of the spreader relative to the pin, said spreader flaring in configuration to form a wedge portion at its opposite end, said spreader having a projection on at least one of its faces intersecting the longitudinal center line therefor for seating in said recess, said recess and said projection each forming a pair of oppositely directed shoulders for interengagement to yieldingly restrain relative longitudinal movement between the pin and the spreader when said projection is seated in said recess.

5. In a cotter pin assembly, a pin comprising a pair of arms connected together by a loop portion, at least one of said arms having a recess on its inner face intersecting the longitudinal center line of said face, and a spreader between said arms having two shoulders extending laterally outward near one end in engagement with opposite sides of said pin to limit lateral movement of the spreader relative to the pin, said spreader flaring in configuration to form a wedge portion at its opposite end, said spreader having a projection on at least one of its faces intersecting the longitudinal center line therefor for seating in said recess, said recess and said projection having oppositely sloping sides intersecting said center line for interengagement to yieldingly restrain relative longitudinal movement between the pin and the spreader when said projection is seated in said recess.

6. In a cotter pin assembly, a pin comprising a pair of arms connected together by a loop portion, at least one of said arms having a generally conical recess on its inner face intersecting the longitudinal center line of said face, and a spreader member between said arms having shoulders at one end and a wedge portion at the other, said spreader member having a generally conical projection on at least one of its faces to seat in said recess to yieldingly restrain relative longitudinal movement between said pin and said spreader member.

7. In a cotter pin assembly, a pin comprising a pair of arms connected together by a loop portion, at least one of said arms having a transverse groove on its inner face, and a spreader member between said arms having shoulders at one end and a wedge portion at the other end, said spreader member having a transverse rib on at least one of its faces for seating in said transverse groove to yieldingly restrain relative longitudinal movement between said pin and said spreader member.

8. In a cotter pin assembly, a pin comprising a pair of arms connected together by a loop, at least one of said arms having a recess on its inner face of short longitudinal and lateral extent, said recess being spaced inwardly from the edges of said face, and a spreader member between said arms having shoulders at one end and a wedge portion at the other, said spreader member having a projection on at least one of its faces spaced inwardly from the edges of the spreader member to seat in said recess to yieldingly restrain longitudinal relative movement between the spreader member and the pin.

SVEN J. STRID.